United States Patent [19]
Lin

[11] Patent Number: 5,915,955
[45] Date of Patent: Jun. 29, 1999

[54] CONTROL MECHANISM FOR GAS WELDING GUNS

[76] Inventor: Arlo H. T. Lin, No. 5, Lane 25, Tatung Rd., Wu Fong Hsiang, Taichung, Taiwan

[21] Appl. No.: 08/819,054

[22] Filed: Mar. 18, 1997

[30] Foreign Application Priority Data

Dec. 23, 1996 [TW] Taiwan ................................. 85219918

[51] Int. Cl.$^6$ ................................. F23D 14/28; B23K 3/02
[52] U.S. Cl. ........................... 431/344; 431/255; 126/413
[58] Field of Search .................................... 126/226, 236, 126/237, 238, 413, 414, 406; 431/344, 255, 256

[56] References Cited

U.S. PATENT DOCUMENTS

| | | | |
|---|---|---|---|
| 4,273,528 | 6/1981 | Gobelt | 431/255 |
| 4,502,465 | 3/1985 | Yosinaga et al. | 431/255 |
| 4,641,632 | 2/1987 | Nakajima | 126/413 |
| 4,688,552 | 8/1987 | Tsai | 126/414 |
| 5,154,601 | 10/1992 | Capilla | 431/255 |
| 5,215,076 | 6/1993 | Oglesby et al. | 126/413 |
| 5,326,256 | 7/1994 | Shike et al. | 431/255 |
| 5,490,496 | 2/1996 | Lin | 126/414 |
| 5,620,318 | 4/1997 | Tsai | 126/414 |
| 5,771,880 | 6/1998 | Tsai | 126/414 |
| 5,771,881 | 6/1998 | Oglesby et al. | 126/414 |

*Primary Examiner*—Ira S. Lazarus
*Assistant Examiner*—David Lee
*Attorney, Agent, or Firm*—Pro-Techtor International Services

[57] ABSTRACT

A control mechanism for gas welding guns including a control chamber disposed between a solder head at an upper end and a gas tank at a lower end for screwably connecting the solder head and assembly a connecting seat and a gas flow adjusting disk at an upper end of the gas tank. The control chamber is fitted with a control cover which may slidably coupled to a window opening defined by the control chamber and a plurality of shallow depressions on the outer surface of the control chamber. The inner side of the control cover is integrally provided with a clamp plate which is integrally provided with a base with two side hooks. The two facing walls of the window opening of the control chamber are respectively provided with bosses. The bottom end of the control cover is connected to a metal elastic plate for linking-up with a gas release lever, and a support plate disposed near a bottom end of the elastic plate links-up with the piezo-electric element in the control chamber such that when the control cover is pushed upwardly, simultaneous ignition and a steady flame may be achieved.

5 Claims, 7 Drawing Sheets

CONTROL MECHANISM FOR GAS WELDING GUNS

BACKGROUND OF THE INVENTION (a) Field of the Invention

The present invention relates to a control mechanism for gas welding guns, and more particularly to a control mechanism whereby simultaneous ignition and a controlled flow of gas to achieve a steady flame may be achieved by upward pushing of a control cover.

(b) Description of the Prior Art

As pen type gas welding guns are convenient to carry and no longer restricted by wires or electrical connection in use, they are becoming more popular. The structure of a conventional pen type welding gun essentially comprises a gas tank and a piezo-electric element. When gas is released and the piezo-electric element is pressed, sparks are generated and a flame is ignited.

In use, it is often necessary to control the gas flow to achieve a steady flame. And with conventional welding guns, a number of control steps have to be carried out after ignition in order to achieve a controlled flow of gas, which is inconvenient.

SUMMARY OF THE INVENTION

According to a primary aspect of the present invention, a control mechanism for welding guns essentially comprises a control cover disposed on the surface of a control chamber defined by two hollow facing shell halves. The control cover may be synchronously linked up with a gas release lever and a piezo-electric element. And due to the arrangement of bosses on the opposing walls of the control chamber and a base and side hooks of a clamp plate, when the control cover is pushed upwardly, simultaneous ignition and a controlled flow of gas to achieve a steady flame may be accomplished.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
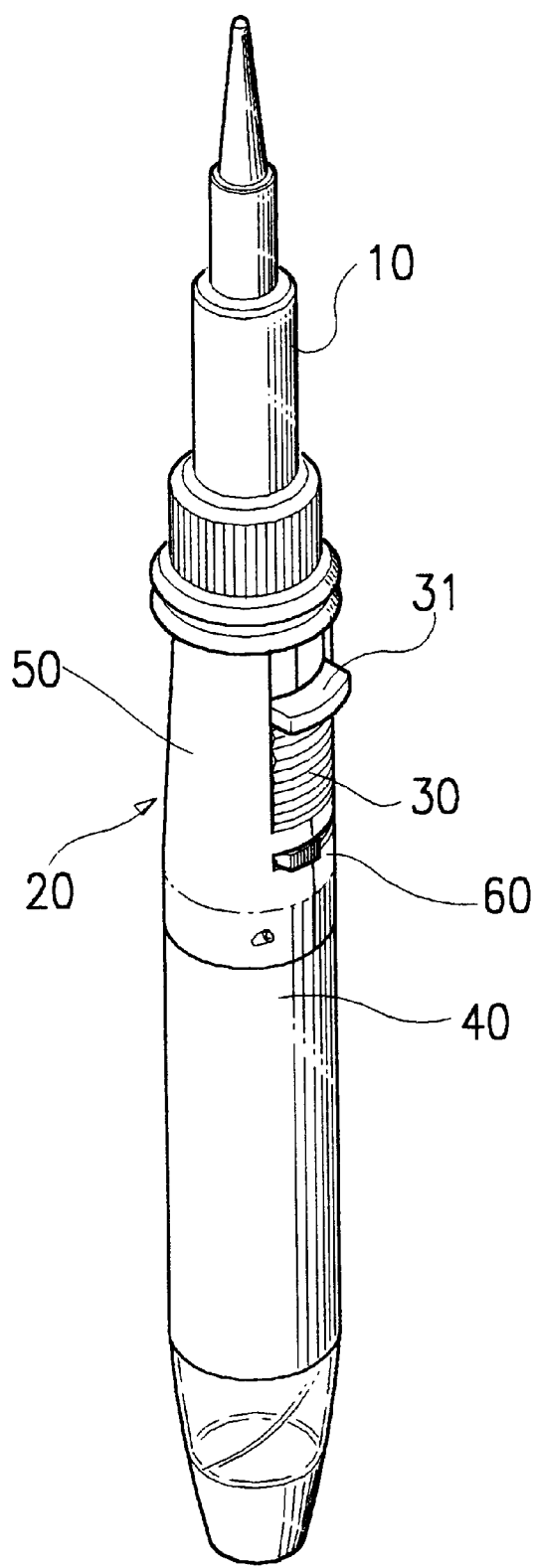
FIG. 1 is an elevational view of a preferred embodiment of the present invention.

With reference to FIG. 1, the pen-like gas welding gun according to the present invention essentially comprises a solder heat 10, a control chamber 20 located below the solder heat 10, a control cover 30 coupled with the surface of the control chamber 10, and a gas tank 40 located below the control chamber 20.

Figure 2:
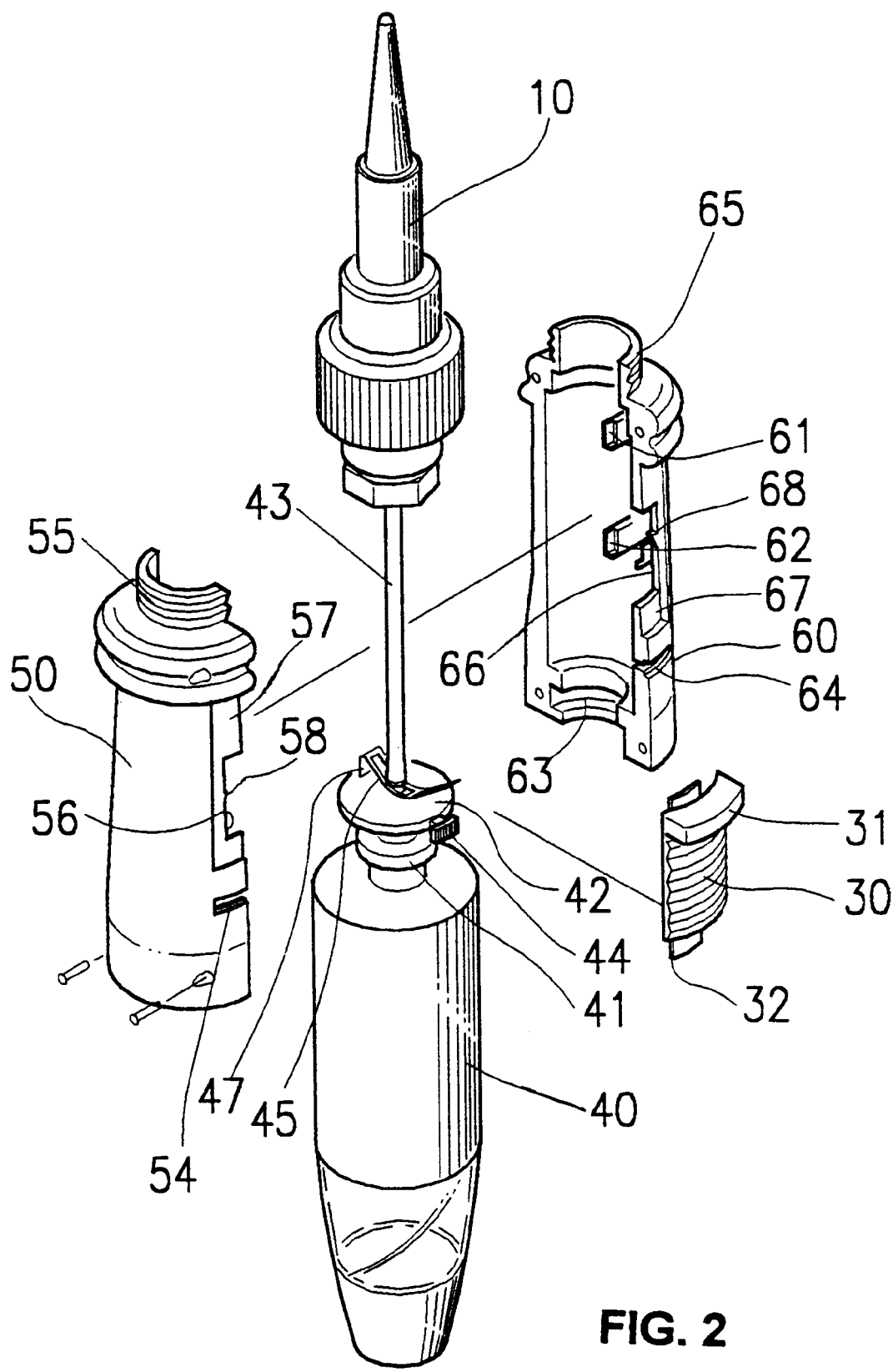
FIG. 2 is an exploded view of FIG. 1, showing the main elements.

Referring to FIG. 2, the control chamber 20 is comprised of two facing hollow shell halves 50 and 60. A top end of the gas tank 40 is provided with a connecting seat 41 and a gas flow adjusting disk 42, and gas may reach the solder head 10 from the connecting seat 41 by use of a flexible connecting tube 43.

Figure 3:
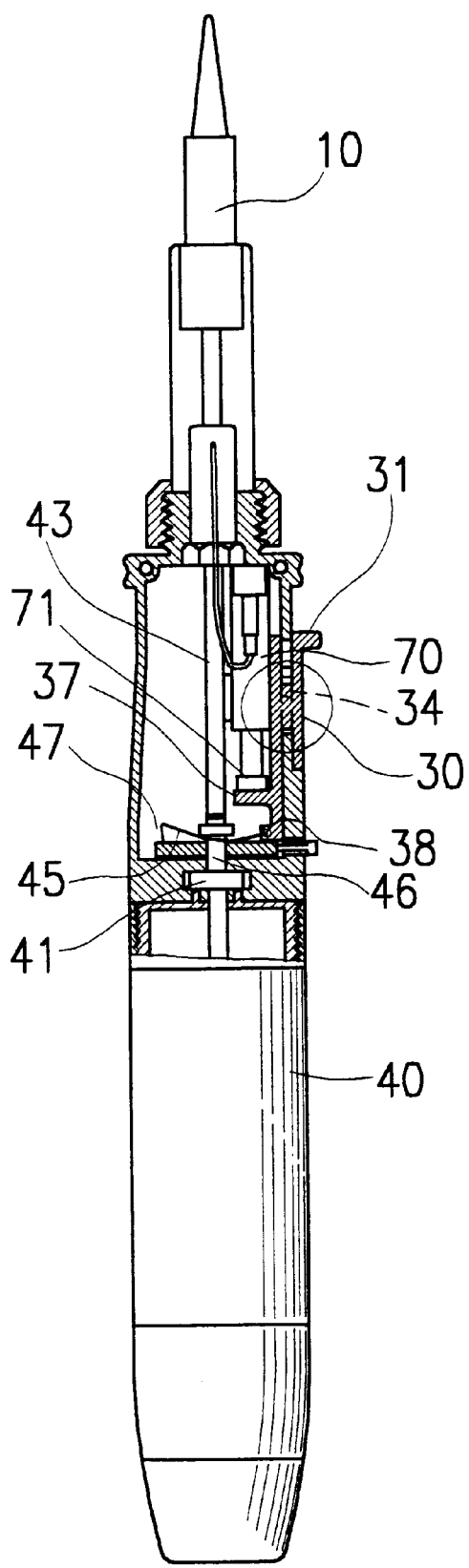
FIG. 3 is a sectional view of FIG. 1, showing the structure prior to operation.

As shown in FIGS. 2 and 3, the shell halves 50 and 60 together define a hollow compartment for passage of the connecting tube 43. Besides, pre-disposed facing upper and lower partition plates 61 and 62 are provided for insertion of a piezo-electric element 70. At the same time, two facing semi-circular slots 63 are disposed near the lower portions for positioning the connecting seat 41. The adjusting disk 42 has a rotary knob 44 may be exposed on the outside through two facing peripheral slots 54 and 64 of the shell halves 50 and 60. Two facing external threaded sections 55 and 65 are disposed near the upper portion for screwably connecting the solder head 10. The shell halves 50 and 60 are further provided with respective notches 56 and 66 near the central portion, the notches facing each other for commonly defining a window opening. Two shallow depressions 57 and 67 are formed near the outer surface of the window opening for assembly the control cover 30. The respective notches 56 and 66 are respectively provided with facing bosses 58 and 68 at the wall near the central point.

Figure 4:
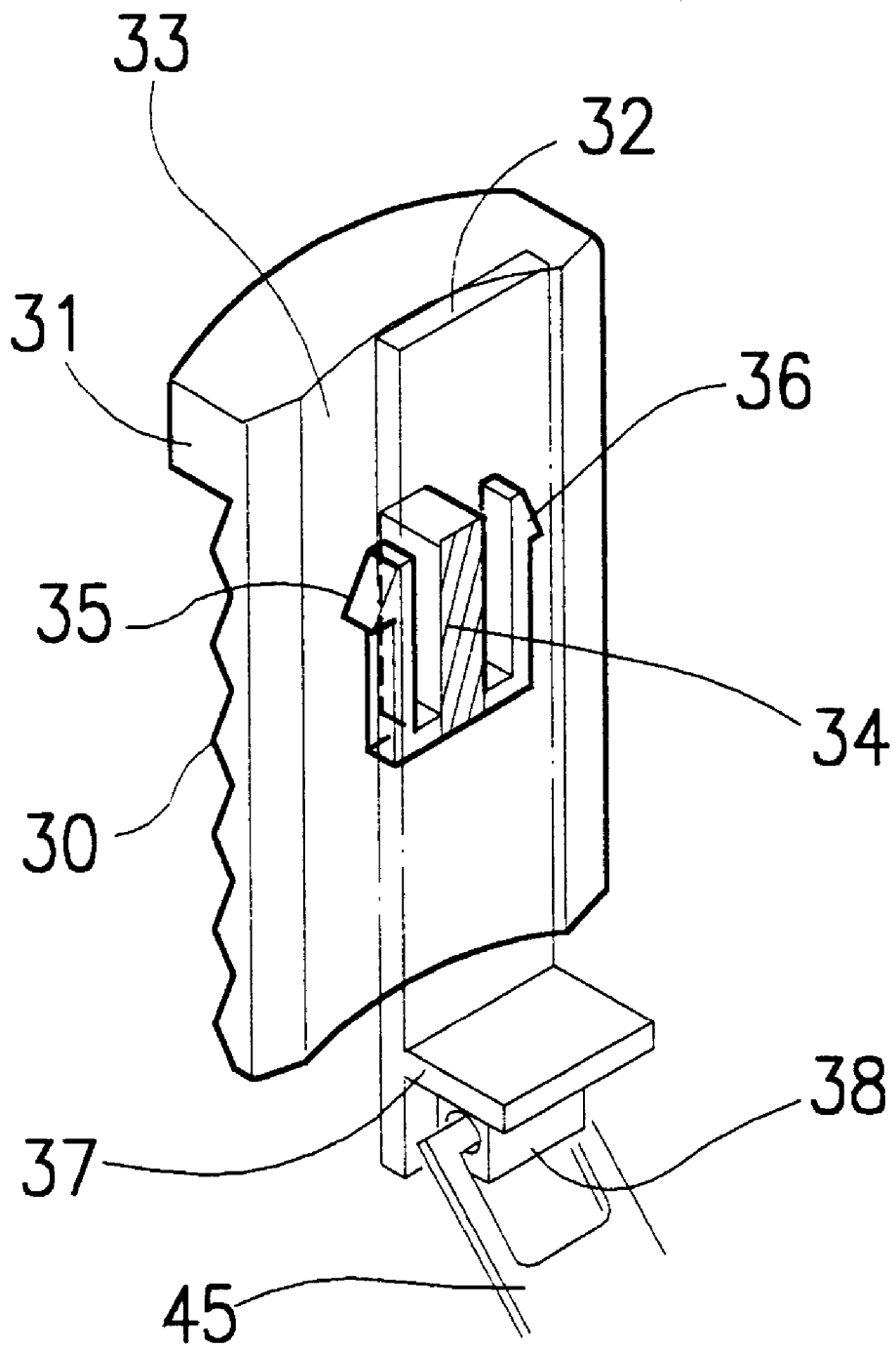
FIG. 4 is a schematic elevational view of the inner side of the control cover.

Referring now to FIGS. 2 and 4, the control cover 30 is provided with a relatively projecting lever portion 31 near the top end thereof, and thin clamp plate 32 is integrally disposed at its inner surface. The clamp plate 32 is located above a curved groove 33 formed at the inner side of the control cover 30, and a relatively small base 34 is used to connect integrally with the curved groove 33. The base 34 is provided with two elastic hooks 35 and 36, one on each side thereof. The clamp plate 32 is provided with a support plate 37 near the lower end, and a base block 38 is disposed at the center of the bottom side of the support plate 37. The base block 38 has a through hole for assembly one end of a metal elastic plate 45. The elastic plate 45, as shown in FIG. 3, is attached to the lower side of a release lever 46. The other end of the elastic plate 45 is bent to lie against the surface of the adjusting disk 42. The entire control cover 30 may lie in the shallow depressions 57 and 67 formed by the shell halves 50 and 60, and through the clamp plate 32 and the lateral clamp grooves formed at the inner side thereof, the control cover may be clamped in the window opening formed by the notches 56 and 66.

Figure 7:
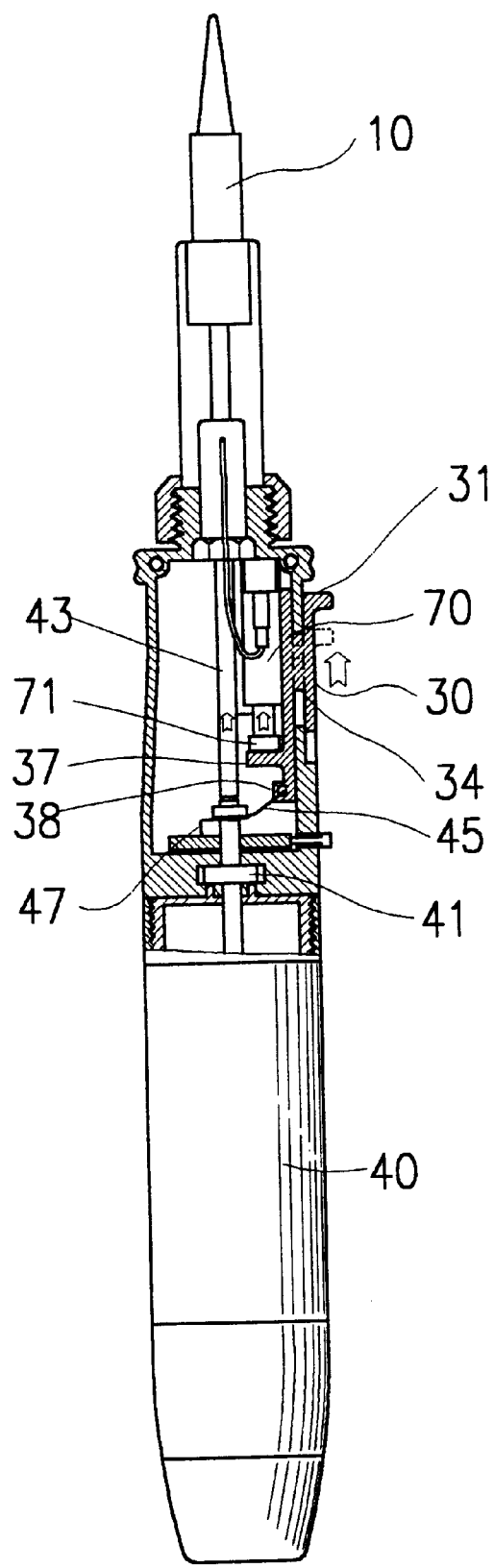
FIG. 7 is a sectional view of FIG. 3, showing the control cover having been pushed upwardly.

As shown in FIG. 3, prior to operation, the control cover 30 thus assembled is located below the depressions 57 and 67, and a tag 37 thereof is supported below a push button 71 of the piezo-electric element 70. At the same time, the base block 38 has not pulled up the elastic plate 45. Referring to FIG. 7, when the control cover 30 is pushed upwardly, the elastic plate 45 and the base block 38, which are connected at one end, will be pulled upwardly therewith at that end, so that the release lever 46 is synchronously lifted to release the gas. At the same time, the push button 71 of the piezo-electric element 70 causes the generation of sparks due to linking-up with the support plate 37, thus igniting the welding gun.

Figure 5:
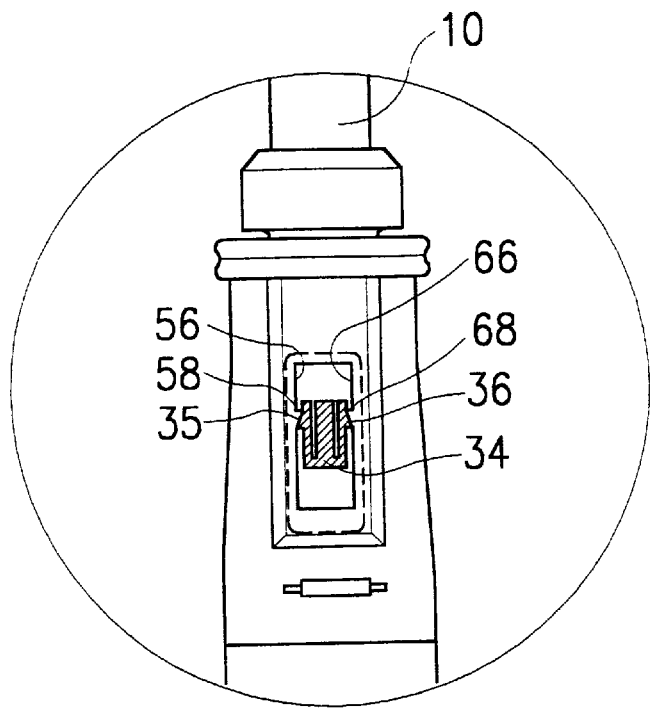
FIG. 5 is a partially enlarged view of FIG. 3, showing the position of the control cover before it is pushed upward.
Figure 6:
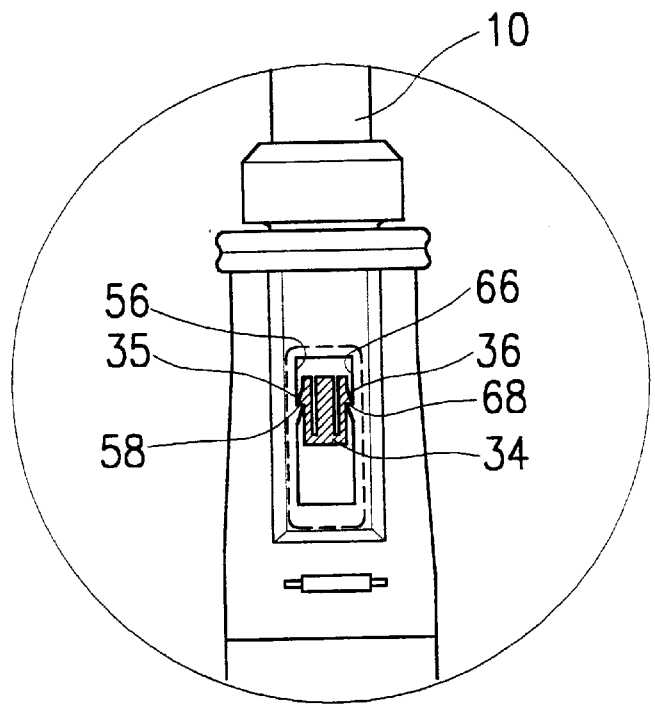
FIG. 6 is an enlarged view of FIG. 3, showing the control cover having been pushed to a predetermined position.

During the process when the control cover 30 is pulled upwardly, referring to FIG. 5, the two hooks 35 and 36 at both sides of the base 34 will firstly pass through the the opposing bosses 58 and 68 formed on the walls of the window opening of the shell halves 50 and 60 so that the hooks 35 and 36 are forced to slightly retract under an external force. And after they have completely passed through the bosses 58 and 68, referring to FIG. 6, due to the resilience of the hooks 35 and 36 themselves, the entire control cover is properly positioned to achieve a steady flame.

Figure 8:
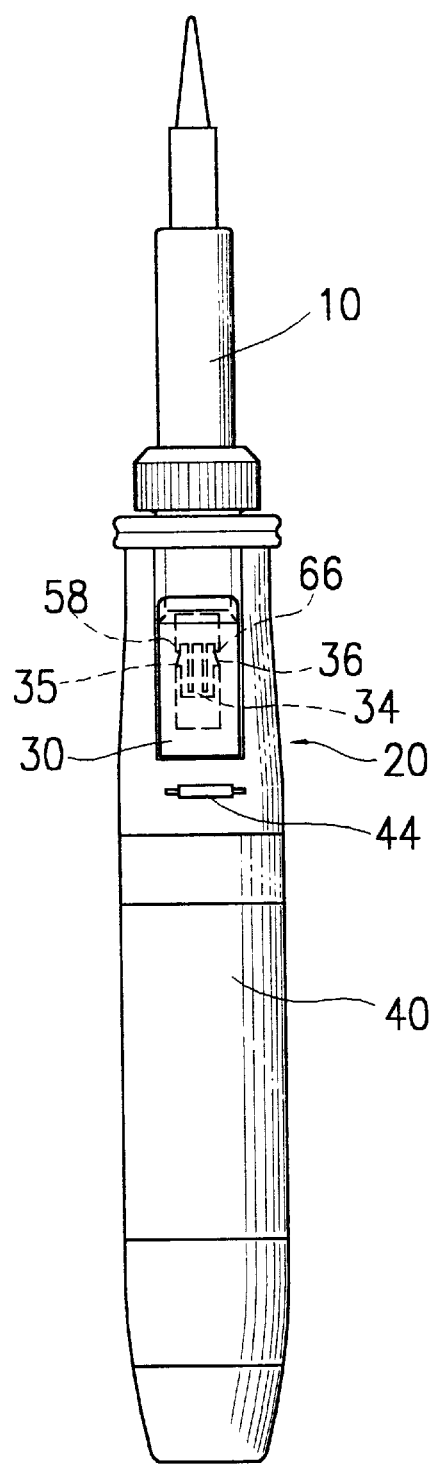
FIG. 8 is a front view of FIG. 1, showing the control cover before it is pushed upward.
Figure 9:
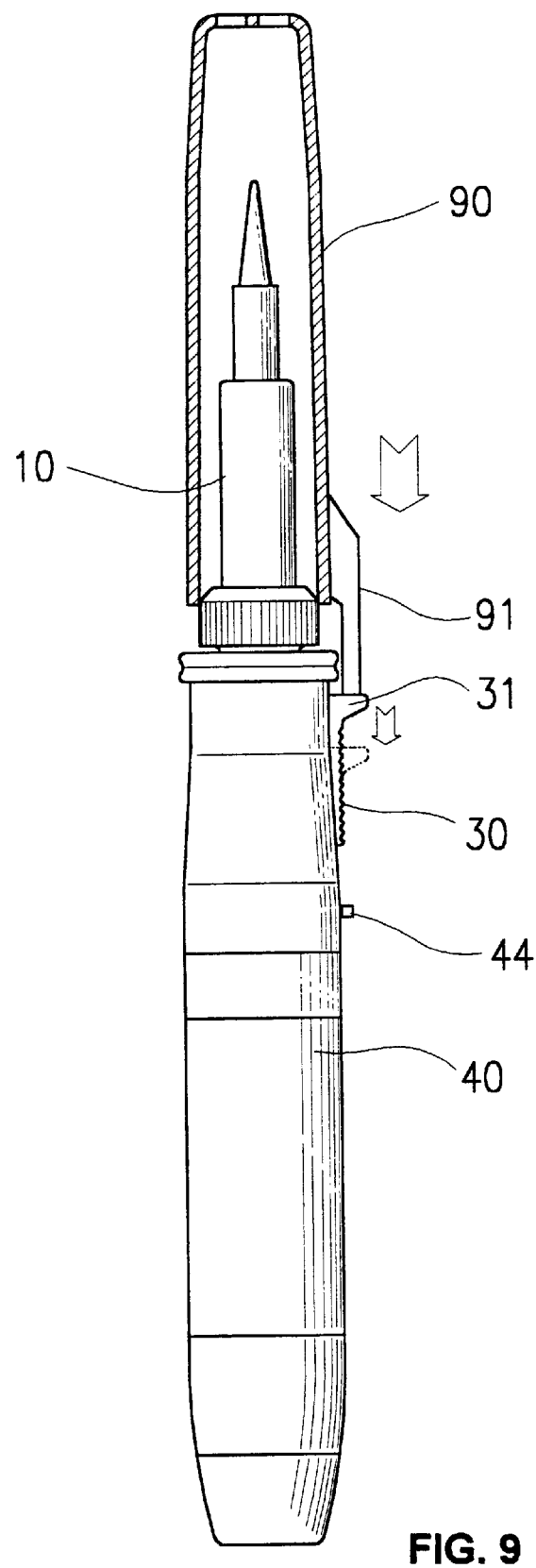
FIG. 9 is a side view of FIG. 8, showing the control cover having been pushed upward.

Certainly, the hooks 35 and 36 may be caused to retract when the control cover 30 is passed, so that the elastic plate 45 is no longer subjected to the external force and resets to its original close position. In another preferred embodiment, referring to FIGS. 8 and 9, the control cover 30 may, after ignition, be pushed through a cap 90 so that it retracts. The cap 90 may be provided with a clamp piece 91 which droops downwardly to a certain length. When the entire cap 90 closes upon the solder head 10, the dropping clamp plate 91 may synchronously press the lever portion 31 of the control cover 30 to push the control cover 30 back to its original close position, thus ensuring positive closure of the welding gun after use.

According to the present invention, after the control cover has been pushed upwardly, simultaneous ignition and steady release of gas may be achieved, without the need for various control actions as required in the prior art.

Although the present invention has been illustrated and described with reference to the preferred embodiment thereof, it should be understood that it is in no way limited to the details of such embodiment but is capable of numerous modifications within the scope of the appended claims.

What is claimed is:

1. A control mechanism for a gas welding gun comprising:
    a solder head with an internal combustion chamber therein, a gas tank, a piezo-electric element for ignition of gas from said gas tank, and a control chamber; wherein
        said control chamber is provided between said solder head and said gas tank, said gas tank is in communication with said solder head by means of a connecting tube, said connecting tube provides a means for gas from said gas tank to be delivered to said internal combustion chamber,
        a connecting seat and a gas flow adjusting disk are attached at an upper end of said gas tank to provide an interface between said gas tank and said control chamber,
        said control chamber includes a window opening defined in said control chamber by a plurality of shallow depressions on an outer surface of said control chamber, a control cover covers said control chamber and has a thin clamp plate integrally formed at an inner side thereof, said clamp plate being integrally provided with a base with two side hooks, said side hooks mate with respective bosses on two opposing walls of said window opening of said control chamber, a bottom end of said control cover is connected to a metal elastic plate for connection to a gas release lever by means of a support plate disposed near a bottom end of said clamp plate, said support plate is connected to a piezo-electric element within said control chamber, such that simultaneous ignition and a steady flame is achieved by a user pushing said control cover upward.

2. The control mechanism as claimed in claim 1 wherein:
    said control chamber is comprised of two facing hollow shell halves defining a hollow compartment therebetween, said control chamber further includes opposing upper and lower partition plates provided therein for insertion of said piezo-electric element, two facing threaded sections are provided at an upper end of said shell halves for mounting said solder head, and two facing slots are disposed near a lower end of said control chamber to receive said connecting seat of said gas tank such that an adjusting knob of said adjusting disk above said connecting seat is exposed from two peripheral slots.

3. The control mechanism as claimed in claim 1 wherein:
    said support plate of said control cover is disposed at an inner side of said control cover near a bottom end thereof for urging against said piezo-electric element, said support plate being provided with a base block for assembling one end of said metal elastic plate.

4. The control mechanism as claimed in claim 1 wherein:
    said solder head is fitted with a cap which is provided with a dropping clamp plate such that said dropping clamp plate urges against said control cover.

5. The control mechanism as claimed in claim 1 wherein:
    said metal elastic plate is attached below said release lever with an end of said metal elastic plate pressing against said adjusting disk of said gas tank.

* * * * *